United States Patent [19]

Grass

[11] Patent Number: 4,821,144
[45] Date of Patent: Apr. 11, 1989

[54] CIRCUIT BREAKER WITH MOUNTING CLIP

[75] Inventor: William E. Grass, Whitefish Bay, Wis.

[73] Assignee: Eaton Corporation, Cleveland, Ohio

[21] Appl. No.: 115,705

[22] Filed: Nov. 2, 1987

[51] Int. Cl.⁴ .............................. H02B 1/04
[52] U.S. Cl. .................... 361/353; 200/296; 211/26; 248/225.2; 361/363; 361/376
[58] Field of Search .............. 248/223.3, 225.2 X; 211/26 X; 200/303, 307, 294, 295, 296; 361/346, 353, 355, 356, 358, 361, 363 X, 376 X, 427

[56] References Cited

U.S. PATENT DOCUMENTS

| | | |
|---|---|---|
| 3,111,354 | 1/1963 | Hammerly et al. . |
| 3,172,014 | 7/1965 | Johnson . |
| 4,358,815 | 5/1982 | Koslosky . |
| 4,430,631 | 3/1984 | Forsell et al. . |
| 4,472,761 | 7/1984 | Koslosky . |
| 4,557,047 | 5/1985 | M'Sadoques et al. . |
| 4,720,769 | 1/1988 | Raabe et al. ............... 361/427 |

FOREIGN PATENT DOCUMENTS 2344252 10/1977 France .................. 248/225.2

OTHER PUBLICATIONS

Westinghouse, "WEB/WEHB/WFB Panelboard 225 Ampere Main Lug 3 Phase, 4 Wire, 120/208 Volts Photo 10", Rev. 4/83.
Westinghouse, "WEB/WEHB/WFB Panelboard 225 Ampere Type JB/KB/HKB Main Breaker, 3 Phase, 4 Wire, 277/480 Volts Photo 11", Rev. 4/83.

Primary Examiner—Gerald P. Tolin
Attorney, Agent, or Firm—Andrus, Sceales, Starke & Sawall

[57] ABSTRACT

A circuit breaker (2) has a mounting clip (24) for mounting the breaker to rail structure (6) in a panelboard (10). The clip is movable to a disengaging position to allow the breaker to be mounted against a back wall (34) of an enclosure (36) by standard mounting bolts (35–38), without interference by the clip. The clip is pivotally and translationally mounted to the breaker housing (14), for pivotal movement between engaging and non-engaging positions, and for translational movement between extended and retracted positions. Locking structure (86,88) prevents pivoting of the clip from the engaging to the non-engaging position when the clip is in the translationally extended position.

15 Claims, 3 Drawing Sheets

CIRCUIT BREAKER WITH MOUNTING CLIP

BACKGROUND AND SUMMARY

The invention relates to circuit breakers, and more particularly to a clip enabling alternate mounting arrangements of the breaker.

Various mounting arrangements including clips and hooks are known for mounting circuit breakers to rail structure in panelboards, for example Westinghouse "WEB/WEHB/WFB Panelboard 225 Ampere Main Lug 3 phase, 4 wire, 120/208 Volts Photo 10", April 1983, "WEB/WEHB/WFB Panelboard 225 Ampere Type JB/KB/HKB Main Breaker, 3 phase, 4 wire, 277/480 Volts Photo 11", April 1983, and U.S. Pat. Nos. 3,111,354, 3,172,014, 4,358,815, 4,430,631, 4,472,761, and 4,557,047 incorporated herein by reference.

Various mounting arrangements including threaded bolts are also known for mounting breakers to rail structure in panelboards or for mounting a single breaker in a small enclosure box, for which further reference may be had to the above noted references.

The present invention provides a simple yet effective mounting clip movable between a first position for engaging rail structure in a panelboard, and a second noninterfering position permitting mounting of the breaker in a small enclosure box by standard mounting bolts.

DETAILED DESCRIPTION

Figure 1:
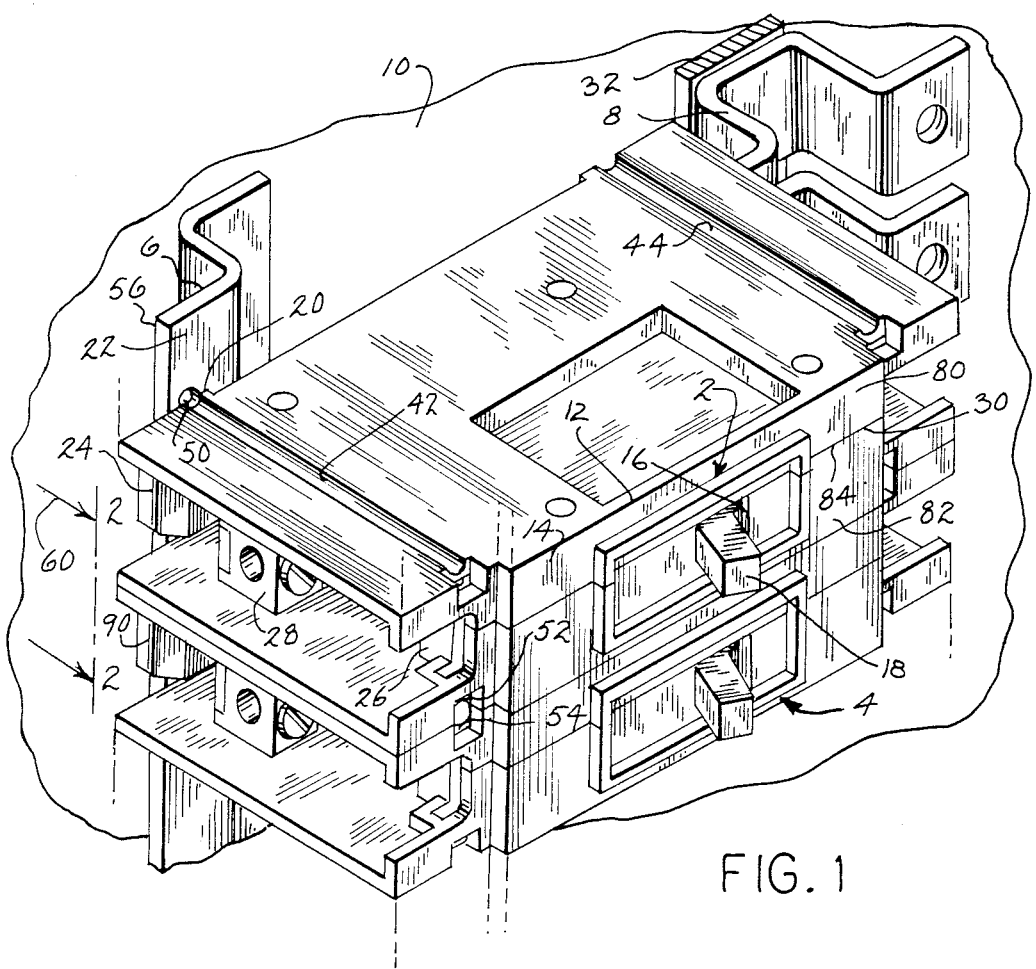
FIG. 1 is a perspective view showing circuit breaker housing and mounting structure in accordance with the invention.
Figure 2:
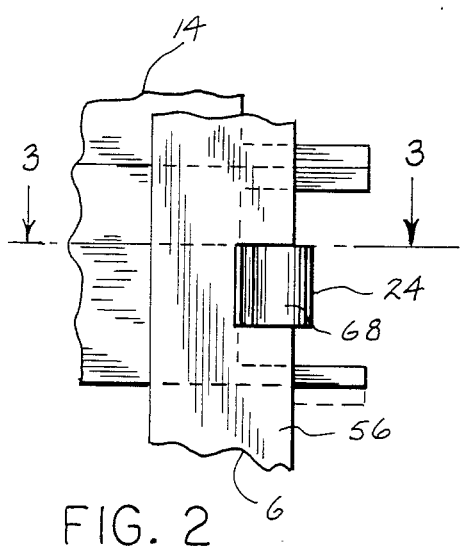
FIG. 2 is a rear elevation of a portion of the structure of FIG. 1 taken along line 2—2.

FIG. 1 shows circuit breakers 2 and 4 mounted to spaced vertical rail 6 and bus bar extension 8 of a bus bar 32 in a panelboard 10, for which further reference may be had to the above noted Westinghouse references and U.S. Pat. Nos. 4,358,815 and 4,472,761. Circuit breaker 2 includes a housing 12 with a vertical frontside 14 having an opening 16 through which a user-engageable pivoted operating handle 18 extends. Housing 12 has a left backside 20 mounted against the front surface 22 of rail 6 by clip 24, to be described. The left side 26 of the breaker housing has a terminal connection lug 28 for electrical circuit connection. The right side 30 of the breaker housing has a terminal connected to bus bar extension 8 for support of the right side of the breaker and also for electrical circuit connection to bus bar 32, for example as shown in above noted U.S. Pat. No. 4,472,761.

Figure 7:
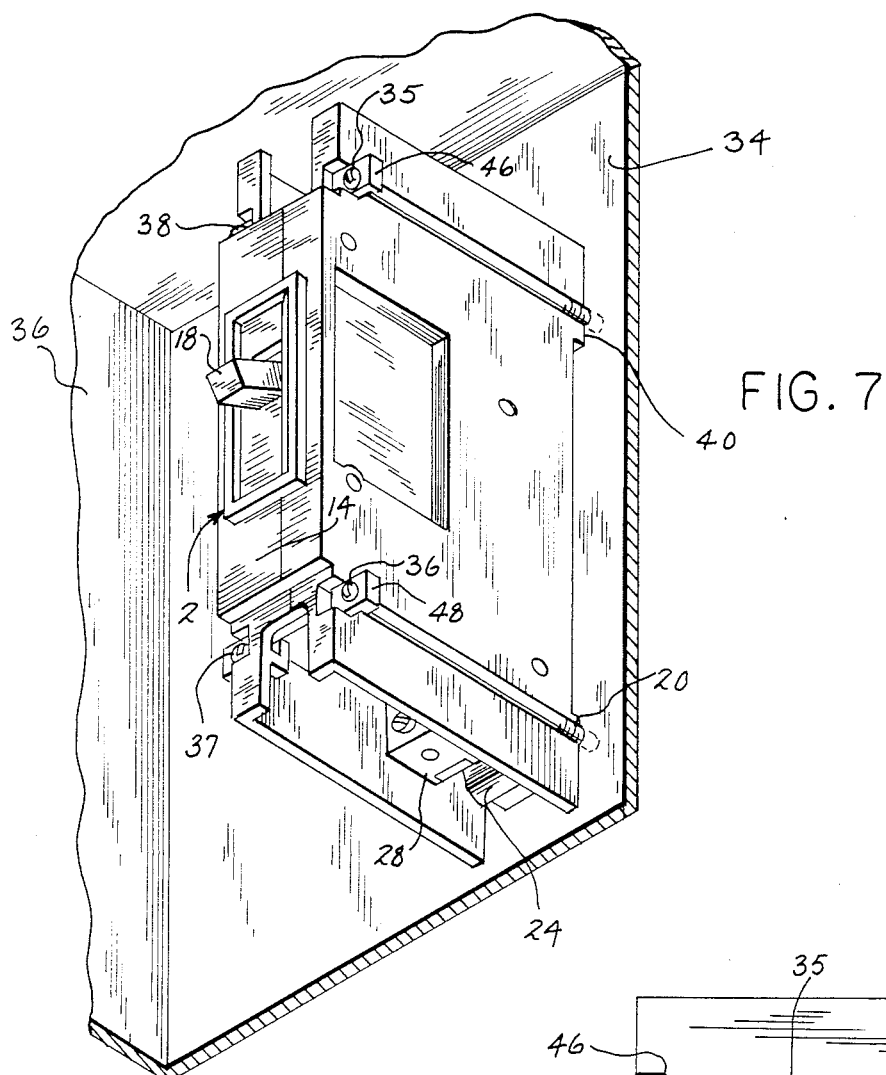
FIG. 7 is a perspective view showing the circuit breaker housing of FIG. 1 mounted in a small enclosure box, with the mounting clip moved to a non-interfering position.
Figure 8:
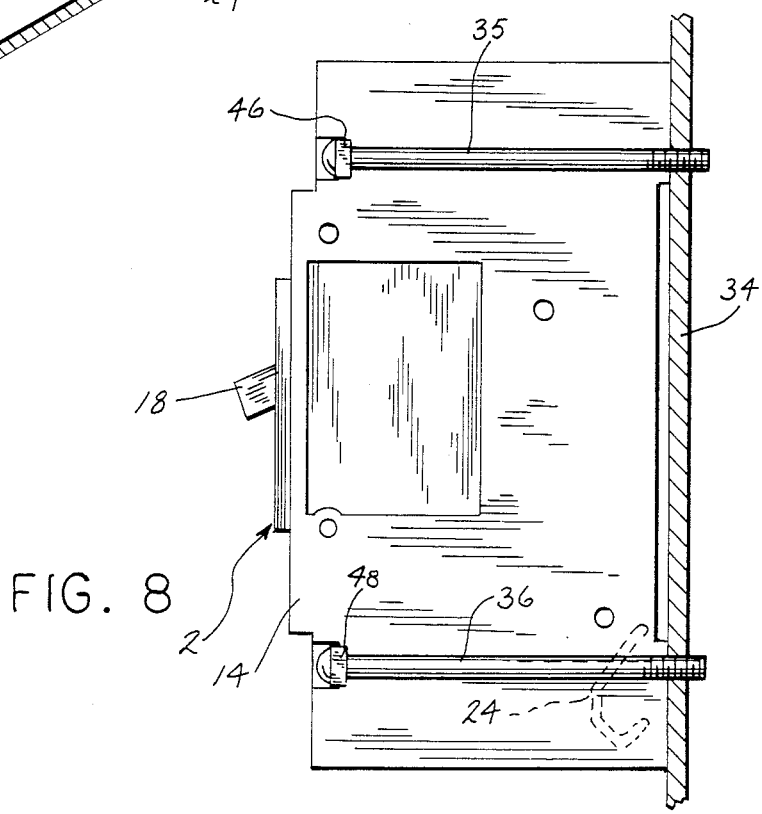
FIG. 8 is a side view of the mounted breaker of FIG. 7.

FIGS. 7 and 8 show an alternate mounting arrangement of a single breaker 2 against a back wall 34 in a small enclosure box 36. Breaker 2 is mounted to back wall 34 by four threaded bolts 35, 36, 37 and 38 extending from the front surface of the breaker housing rearwardly through tapped threaded holes in back wall 34. The backsides 20 and 40 of breaker housing 14 are against the front surface of back wall 34. The breaker housing has semi-circular grooves, for example as best seen at 42 and 44 in FIG. 1, for receiving the respective bolts. The front faces of the grooves are shouldered and engaged by clamping washers such as 46 and 48, FIG. 7, for better retention. The breaker in FIG. 7 is typically mounted vertically, while the breakers in FIG. 1 are mounted horizontally.

Referring to the multiple breaker horizontal mounting arrangement in FIG. 1, the left sides of the breakers have typically been mounted by mounting bolts. For example, mounting bolt 37 of FIG. 7 would extend in groove 42 in FIG. 1 and thread into threaded aperture 50 in rail 6. A semi-circular groove 52 in the bottom surface of breaker 2 mates with a semi-circular groove 54 in the top surface of breaker 4 and receives a mounting bolt such as 36 which also extends rearwardly and is threaded into rail 6. The structure is repeated for multiple breaker mounting.

The mounting structure described thus far for FIGS. 1 and 7, except for clip 24, is known in the art. The present invention involves mounting clip 24.

Figure 3:
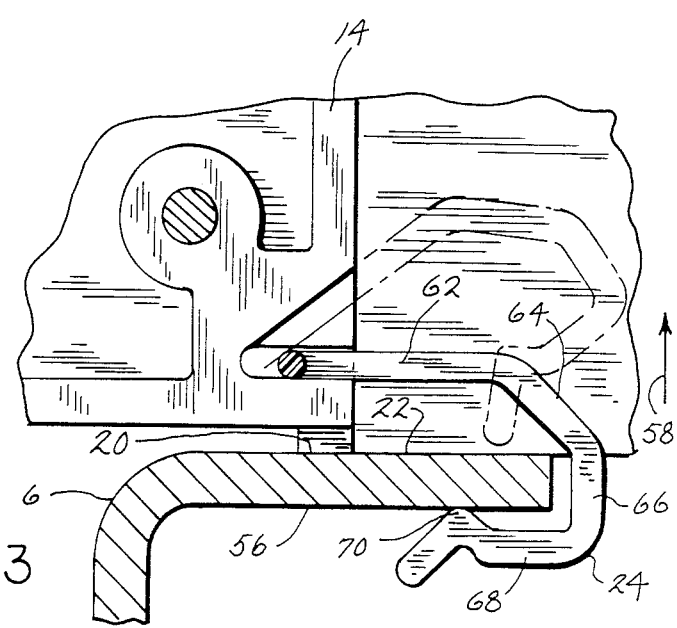
FIG. 3 is a sectional view taken along line 3—3 of FIG. 2.

Clip 24 is mounted to housing 14 and has a first position, shown in solid line in FIG. 3, engaging the back surface 56 of rail 6 to mount left backside 20 of the breaker housing against the front surface 22 of rail 6. This enables the elimination of mounting bolts such as 36 and 37. Clip 24 is movable to a second position, shown in dashed line in FIG. 3, disengaging rail 6 and being in a non-intefering position permitting the backside 20 of the breaker housing to be mounted against back wall 34 of the enclosure in FIG. 7. This non-interfering position is also shown in dashed line in FIG. 8. The non-interfering position of the clip further allows the breaker to be mounted to rail 6 in a panelboard by bolts such as 36 and 37 is desired.

Clip 24 moves forwardly, as shown at arrow 58 in FIG. 3, and 60 in FIG. 1, to move from the engaging to the non-engaging position. Clip 24 is forward of the backside 20 of the breaker housing in the dashed line non-engaging position and does not interfere with mounting of the backside 20 of the breaker housing against back wall 34 in FIG. 7. In the engaging position, as seen in solid line in FIG. 3, clip 24 has a root portion 62 forward of rail 6 and extending parallel thereto, an angled portion 64 extending at an angle rearwardly to a rearwardly extending portion 66 which bends around the backside of rail 6 at portion 68, and has a crimped portion 70 to engage the back surface 56 of rail 6. Clip 24 is preferably hard plastic or nylon, and is preferably glass filled for added strength.

Figure 5:
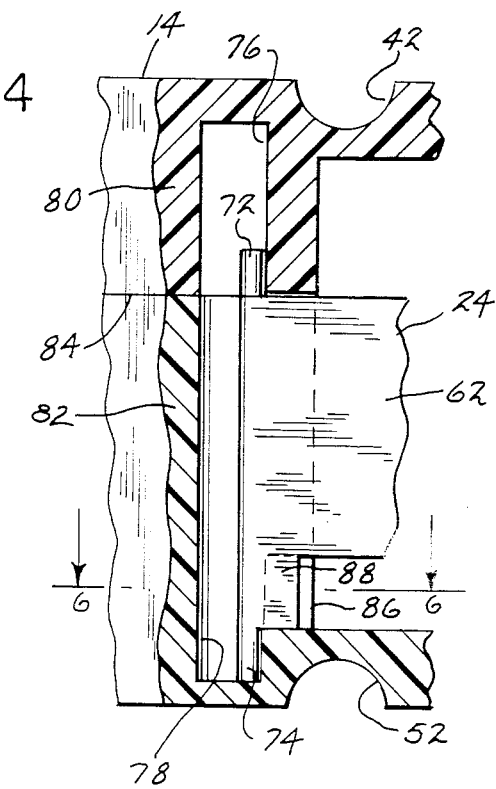
FIG. 5 is a top view partially in section of the structure of FIG. 3.
Figure 6:
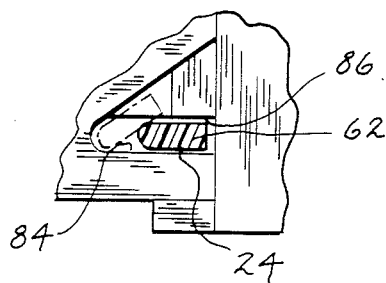
FIG. 6 is a sectional view taken along line 6—6 of FIG. 5.

Clip 24 is pivotally and translationally mounted to breaker housing 14. The clip has upper and lower end trunions 72 and 74, FIG. 4, received in slots 76 and 78, FIG. 5, in respective upper and lower breaker housing sections 80 and 82. Breaker housing 14 is a two piece molded housing having upper and lower housing sections 80 and 82 joined at a horizontal (in the orientation of FIG. 1) parting line 84 parallel to the plane of movement of operating handle 18 in its arc of movement. Clip 24 pivots about trunions 72 and 74 between the solid line engaging position in FIG. 3 and the dashed line disengaging position in FIG. 3. The clip is translationally movable between extended and retracted positions. FIG. 1 shows the leftward extended translational position of clip 24 which is the rightward extended translational position in FIG. 5 with trunions 72 and 74 stopped against the right edges of slots 76 and 78 as viewed in FIG. 5. FIGS. 3 and 6 show the translationally retracted position of clip 24 in dashed line.

A locking mechanism is provided to prevent pivoting of clip 24 from the engaging solid line position of FIG. 3 to the non-engaging dashed line position of FIG. 3 when clip 24 is in the translationally extended position. The locking mechanism permits pivoting of clip 24 from the solid line to the dashed line position of FIG. 3 when clip 24 is in the retracted position.

Figure 4:
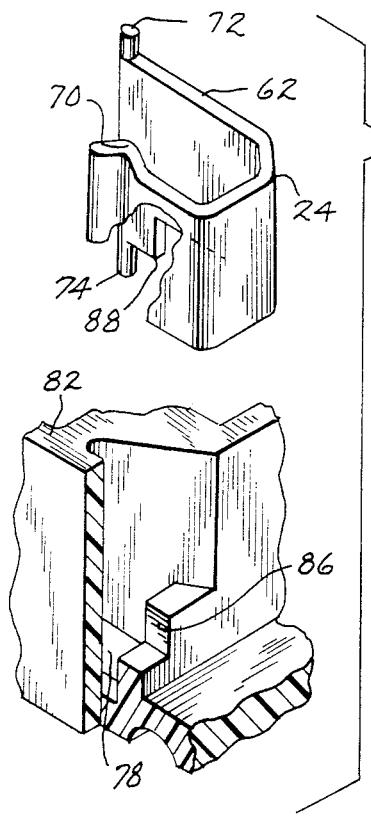
FIG. 4 is an exploded perspective view of the structure of FIG. 3.

The locking mechanism is provided by a pair of stop shoulders 86 and 88, FIG. 4. Stop shoulder 86 is formed in the breaker housing at the end of slot 78. Stop shoulder 88 is formed on clip 24 adjacent trunion 74. When clip 24 is translated to its extended position, trunions 72 and 74 are at the right end of the slots in FIGS. 3–6, and stop shoulder 86 in the breaker housing is aligned with stop shoulder 88 on clip 24 and prevents pivoting of clip 24 to the dashed line non-engaging position of FIG. 3. In FIGS. 3–6, when clip 24 is translated to the retracted position, i.e. leftwardly, trunions 72 and 74 are at the left end of slots 76 and 78, and stop shoulder 88 on clip 24 is moved leftwardly out of alignment with stop shoulder 86 in the breaker housing, to permit pivoting of clip 24 to the dashed line position in FIG. 3.

The remaining breakers such as 4 are also mounted by clips such as 90 comparable to clip 24.

It is recognized that various equivalents, alternatives and modifications and possible within the scope of the apended claims.

I claim:

1. A circuit breaker mounted to support structure, comprising a housing having a frontside with a user-engageable operating handle extending therethrough, and having a backside, a mounting clip connected to said housing and moveable between a first position engaging said support structure and mounting said breaker thereto, and a second position out of the way of and noninterferring with said support structure, wherein said clip in said first position extends rearwardly beyond said backside, and wherein said clip in said second position is forward of said backside, said clip being connected to said housing in each of said first and second positions.

2. The invention according to claim 1 wherein said clip is pivotally and translationally mounted to said housing, said clip being pivotally moveable between said first and second positions, said clip being translationally movable between extended and retracted positions.

3. A circuit breaker mounted to support structure, comprising a housing having a frontside with a user-engageable operating handle extending therethrough, and having a backside, a mounting clip pivotally and translationally mounted to said housing, said clip being pivotally moveable between a first position wherein said clip extends rearwardly beyond said backside and engages said support structure, and a second position wherein said clip is forward of said backside, said clip being translationally moveable between extended and retracted positions, locking means preventing pivoting of said clip from said first to said second position when said clip is in said extended position, and permitting pivoting of said clip between said first and second positions when said clip is in said retracted position.

4. A circuit breaker mounted to support structure, comprising a housing having a frontside with a user-engageable operating handle extending therethrough, and having a backside, a mounting clip pivotally and translationally mounted to said housing, said clip being pivotally moveable between a first position wherein said clip extends rearwardly beyond said backside and engages said support structure, and a second position wherein said clip is forward of said bakcside, said clip being translationally moveable between extended and retracted positions, wherein said housing has a pair of slots formed in said backside and wherein said clip has a pair of trunions received in said slots such that said clip pivots about an axis along said trunions and such that said clip can move perpendicularly to said axis as said trunions move translationally in said slots.

5. The invention according to claim 4 comprising a pair of stop shoulders, one said stop shoulder formed in said breaker housing at the end of one of said slots, and the other said stop shoulder formed on said clip adjacent one of said trunions, such that when said clip is translated to said extended position said trunions are at one end of said slots and said stop shoulder in said breaker housing is aligned with said stop shoulder on said clip and prevents pivoting of said clip to said second position, and such that when said clip is translated to said retracted position said trunions are at the other end of said slots and said stop shoulder on said clip is moved out of alignment with said stop shoulder in said breaker housing to prevent pivoting of said clip between said first and second positions.

6. A circuit breaker having a first condition mounted in a panelboard having rail structure and having a second condition mounted in an enclosure having a back wall, said rail structure having a front surface and a back surface within said panelboard, said back wall of said enclosure having a front surface, said breaker comprising a housing having a frontside with a user-engageable operating handle extending therethrough, said breaker housing having a backside mounted against said front surface of said rail structure in said panelboard, and mounted against said front surface of said back wall of said enclosure when mounted in said enclosure, mounting means mounting said backs of said breaker housing against said back wall in said enclosure, when said breaker is mounted in said enclosure a two-position moveable mounting clip attached to said breaker housing and having a first position engaging said rail structure and mounting said breaker housing thereto in said panelboard, said clip being moveable to a second position out of the way of and non-interferring with said rail structure such that said backside of said breaker housing is mountable against said back wall in said enclosure by said first mentioned mounting means, wherein said clip in said first position extends rearwardly beyond said backside, and wherein said clip in said second position is forward of said backside, said clip being connected to said housing in each of said first and second positions.

7. The invention according to claim 6 wherein said clip moves forwardly from said first to said second position such that said clip is forward of said backside of said breaker housing and does not interfere with mounting of said backside of said breaker housing against said back wall of said enclosure by said first mounting means.

8. The invention according to claim 7 wherein said clip is pivotally and translationally mounted to said breaker housing, said clip being pivotally movable between said first and second positions, said clip being translationally movable between extended and retracted positions.

9. A circuit breaker having a first condition mounted in a panelboard having rail structure and having a second condition mounted in an enclosure having a back wall, said rail structure having a front surface and a back surface within said panelboard, said back wall of said enclsoure having a front surface, said breaker comprising a housing having a frontside with a user-engageable operating handle entending therethrough, said breaker housing having a backside mounted against said front surface of said rail structure in said panelboard, and mounted against said front surface of said back wall of said enclosure when said breaker is mounted in said enclosure, mounting means mounting said backside of said breaker housing against said back wall in said enclsoure when said breaker is mounted in said enclosure, a two-position moveable mounting clip attached to said breaker housing and having a first position engaging said rail structure and mounting said breaker housing thereto in said panelboard, said clip being moveable to a second position out of the way of and non-interferring with said rail structure such that said backside of said breaker housing is mountable against said back wall in said enclosure by said first mentioned mounting means, said clip being connected to said housing in each of said first and second positions,
  wherein said clip moves forwardly from said first to said second position such that said clip is forward of said backside of said breaker housing and does not interfere with mounting of said backside of said breaker housing against said back wall of said enclosure by said first mounting means,
  wherein said clip is pivotally and translationally mounted to said breaker housing, said clip being pivotally movable between said first and second positions, said clip being translationally movable between extended and retracted positions,
  and comprising locking means preventing pivoting of said clip from said first to said second position when said clip is in said extended position, and permitting pivoting of said clip between said first and second positions when said clip is in said retracted position.

10. A circuit breaker having a first condition mounted in a panelboard having rail structure and having a second condition mounted in an enclosure having a bakc wall, said rail structure having a front surface and a back surface within said panelboard, said back wall of said enclosure having a front surface, said breaker comprising a housing having a frontside with a user-engageable operating handle extending therethrough, said breaker housing having a backside mounted against said front surface of said rail structure in said panelboard, and mounted against said front surface of said back wall of said enclosure when said breaker is mounted in said enclosure, mounting means mounting said backside of said breaker housing against said back wall in said enclosure when said breaker is mounted in said enclosure, a two-position moveable mounting clip attached to said breaker housing and having a first position engaging said rail structure and mounting said breaker housing thereto in said panelboard, said clip being moveable to a second position out of the way of and non-interferring with said rail structure such that such backside of said breaker housing is mountable against said back wall in said enclosure by said first mentioned mounting means, said clip being connected to said housing in each of said first and second positions,
  wherein said clip moves forwardly from said first to said second position such that said clip is forward of said backside of said breaker housing and does not interfere with mounting of said backside of said breaker housing against said back wall of said enclosure by said first mounting means,
  wherein said clip is pivotally and translationally mounted to said breaker housing, said clip being pivotally movable between said first and second positions, said clip being translationally movable between extended and retracted positions,
  wherein said breaker housing has a pair of slots formed in said backside and wherein said clip has a pair of trunions received in said slots such that said clip pivots about an axis along said trunions and such that said clip can move perpendicularly to said axis as said trunions move translationally in said slots.

11. The invention according to claim 10 comprising a pair of stop shoulders, one said stop shoulder formed in said breaker housing a the end of one of said slots, and the other said stop shoulder formed on said clip adjacent one of said trunions, such that when said clip is translated to said extended position, said trunions are at one end of said slots, and said stop shoulder in said breaker housing is aligned with said stop shoulder on said clip and prevents pivoting of said clip to said second position, and such that when said clip is translated to said retracted position said trunions are at the other end of said slots and sait stop shoulder on said clip is moved out of alignment with said stop shoudler in said breaker housing to permit pivoting of said clip between said first and second positions.

12. A circuit breaker having a first condition mounted in a panelboard having a spaced vertical rail and a bus bar and having a second condition mounted in an enclosure having a back wall, said circuit breaker comprising a housing having a frontside with a user-engageable operating handle extending therethrough, said breaker housing have a right side mounted to said bus bar, said breaker housing having a left backside mounted to said rail said breaker housing having a right backside mounted against said back wall in said enclosure with said left bakcside also mounted against said back wall when said breaker is mounted in said enclosure, said rail having front and rear surfaces, a two-position moveable mounting clip attached to said breaker housing and having a first position engaging said back surface of said rail and mounting said left backside of said breaker housing against said rail, said clip being moveable to a second positon out of the way of and non-interferring with said back surface of said rail such that said left backside of said breaker housing is mountable against said back wall in said enclosure without interference by said clip, wherein said clip in said first position extends rearwardly beyond said backside, and wherein said clip in said second position is forward of said backside, said clip being connected to siad housing in each of said first and second positions.

13. A circuit breaker having a first condition mounted in a panelboard having a spaced vertical rail and a bus bar and having a second condition mounted in an enclosure having a back wall, said circuit breaker comprising a housing having a frontside with a user-engageable operating handle extending therethrough, said breaker housing have a right side mounted to said bus bar, said breaker housing having a left backside mounted to said rail, said breaker housing having a right backside mounted against said back wall in said enclosure with said left backside also mounted against said back wall, when said breaker is mounted in said enclosure, sad rail having front and rear surfaces, a two-position moveable mounting clip attached to said breaker housing and having a first position engaging said back surface of said rail and mounting said left backside of said breaker housing against said rail, said clip being moveable to a second position out of the way of and noninterferring with said back surface of said rail such that said left backside of said breaker housing is mountable against said back wall in said enclosure without interference by said clip, said clip being connected to said housing in each of said first and second positions, means for mounting said breaker housing against said back wall in said enclosure comprising threaded bolt means for mounting said right backside of said breaker housing and said left backside of said breaker housing against said back wall in said enclosure.

14. A circuit breaker mounted to support structure, comprising a housing having a frontside with a user-engageable pivoted operating handle extending therethrough and moveable in an arc in a given plane, said housing being formed by a pair of molded housing sections joined along a parting line lying in a parting plane parallel to said given plane of handle movement along said arc, a two-position moveable mounting clip attached to said housing sections and moveable in a plane parallel to said parting plane, said clip being moveable to a first position engaging said support structure and mounting said breaker thereto, said clip being moveable to a second position out of the way of and non-interferring with said support structure, wherein said clip in said first position extends rearwardly beyond said backside, and wherein said clip in said second position is forward of said backside, said clip being connected to each of said housing sections in each of said first and second positions.

15. A circuit breaker mounted to support structure, comprising a housing having a frontside with a user-engageable pivoted operating handle extending therethrough and moveable in an arc in a given plane, said housing being formed by a pair of molded housing sections joined along a parting line lying in a parting plane parallel to said given plane of handle movement along said arc, a two-position moveable mounting clip attached to said housing sections and moveable in a plane parallel to said parting plane, said clip being moveable to a first position engaging said support structure and mounting said breaker thereto, said clip being moveable to a second position out of the way of and noninterferring with said support structure, said clip being connected to each of said housing sections in each of said first and second positions, wherein said clip is mounted between said housing sections by a pair of trunions each in a slot in a respective one of said housing sections.

* * * * *